United States Patent
Li et al.

(10) Patent No.: US 10,539,676 B2
(45) Date of Patent: Jan. 21, 2020

(54) METHOD, APPARATUS AND COMPUTER PROGRAM PRODUCT FOR MAPPING AND MODELING A THREE DIMENSIONAL STRUCTURE

(71) Applicant: HERE Global B.V., Eindhoven (NL)

(72) Inventors: Bing Li, Chicago, IL (US); Rich Valde, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 119 days.

(21) Appl. No.: 15/466,298

(22) Filed: Mar. 22, 2017

(65) Prior Publication Data

US 2018/0275277 A1   Sep. 27, 2018

(51) Int. Cl.
| | | |
|---|---|---|
| *G06K 9/00* | (2006.01) | |
| *G01S 17/89* | (2006.01) | |
| *G01S 7/48* | (2006.01) | |
| *G01S 17/02* | (2006.01) | |
| *G01C 21/32* | (2006.01) | |

(52) U.S. Cl.
CPC .............. *G01S 17/89* (2013.01); *G01C 21/32* (2013.01); *G01S 7/4808* (2013.01); *G01S 17/023* (2013.01); *G06K 9/00812* (2013.01)

(58) Field of Classification Search
CPC ........ G01S 17/023; G01S 17/42; G01S 17/89; G01S 7/4808; G06K 9/00637; G06K 9/00691; G06K 9/34
See application file for complete search history.

(56) References Cited

U.S. PATENT DOCUMENTS

| | | |
|---|---|---|
| 9,476,730 B2 | 10/2016 | Samarasekera et al. |
| 2005/0207876 A1 | 9/2005 | Springwater |
| | (Continued) | |

FOREIGN PATENT DOCUMENTS

| | | |
|---|---|---|
| DE | 10 2014 111570 A1 | 2/2016 |
| DE | 10 2016 003261 | 9/2016 |

OTHER PUBLICATIONS

Turner, Eric, Peter Cheng, and Avideh Zakhor. "Fast, automated, scalable generation of textured 3d models of indoor environments." IEEE Journal of Selected Topics in Signal Processing 9.3 (2015): 409-421.*

(Continued)

*Primary Examiner* — Avinash Yentrapati
(74) *Attorney, Agent, or Firm* — Alston & Bird LLP

(57) ABSTRACT

Embodiments described herein may provide a method for generating a three-dimensional vector model of the interior of a structure. Methods may include: receiving sensor data indicative of a trajectory; receiving sensor data defining structural surfaces within a structure; generating a three-dimensional point cloud from the sensor data defining structural surfaces within the structure; segmenting the three-dimensional point cloud into two or more segments based, at least in part, on the sensor data indicative of trajectory; generating a three-dimensional surface model of an interior of the structure based on the segmented three-dimensional point cloud with semantic recognition and labelling; and providing the three-dimensional surface model of an interior of the structure to an advanced driver assistance system to facilitate autonomous vehicle parking.

20 Claims, 6 Drawing Sheets

(56) References Cited

U.S. PATENT DOCUMENTS

| | | | | |
|---|---|---|---|---|
| 2009/0262974 | A1* | 10/2009 | Lithopoulos | G06T 7/73 |
| | | | | 382/100 |
| 2010/0274430 | A1* | 10/2010 | Dolgov | G01C 21/20 |
| | | | | 701/25 |
| 2011/0282622 | A1* | 11/2011 | Canter | G06K 9/00691 |
| | | | | 702/150 |
| 2012/0072110 | A1 | 3/2012 | Vankatraman | |
| 2014/0233010 | A1* | 8/2014 | Baldwin | G01C 21/30 |
| | | | | 356/4.01 |
| 2015/0123995 | A1* | 5/2015 | Zavodny | G06T 11/60 |
| | | | | 345/630 |
| 2015/0130797 | A1* | 5/2015 | Chen | G06K 9/00637 |
| | | | | 345/420 |

OTHER PUBLICATIONS

Kummerle, Rainer, et al. "Autonomous driving in a multi-level parking structure." 2009 IEEE International Conference on Robotics and Automation. IEEE, 2009. (Year: 2009).*

Turner, Eric, Peter Cheng, and Avideh Zakhor. "Fast, automated, scalable generation of textured 3d models of indoor environments." IEEE Journal of Selected Topics in Signal Processing 9.3 (2015): 409-421. (Year: 2015).*

Geo-MMS SAASM-Geodetics [online] [retrieved Apr. 25, 2017]. Retrieved from the Internet: <URL: http://geodetics.com/product/geo-mms-saasm/>; located on WayBack Machines at https://web.archive.org/web/20160501000000*/http://geodetics.com/product/geo-mms-saasm/ (Apr. 2016) 4 pages.

Hejc, G. et al., *Seamless Indoor Outdoor Positioning Using Bayesian Sensor Data Fusion on Mobile and Embedded Devices*, [online] [retrieved Apr. 25, 2017]. Retrieved from the Internet: <URL: http://www.iis.fraunhofer.de/content/dam/iis/de/doc/lv/los/lokalisierung/Seamless%20Indoor%20Outdoor%20Positioning%20using%20Bayesian%20Sensor%20Data%20Fusion%20on%20Mobile%20and%20Embedded%20Devices.pdf>. (2013) 8 pages.

Kummerle, R. et al., *Autonomous Driving in a Multi-Level Parking Structure*, [online] [retrieved Apr. 25, 2017]. Retrieved from the Internet: <URL: http://ais.informatik.uni-freiburg.de/publications/papers/kuemmerle09icra.pdf>. (2009) 6 pages.

Liu, J. et al., *iParking: An Intelligent Indoor Location-based Smartphone Parking Service*, [online] [retrieved Apr. 25, 2017]. Retrieved from the Internet: <URL: https://www.ncbi.nlm.nih.gov/pmc/articles/PMC3522932/>. (dated Oct. 31, 2012) 15 pages.

Maddern, W. et al., *Leveraging Experience for Large-Scale Lidar Localisation in Changing Cities*, [online][retrieved Apr. 25, 2017]. Retrieved from the Internet: <URL: https://pdfs/semanticscholar.org/c1c8/933bcefb2765b2f9f06d25e5766882bec4c1.pdf>. (2015) 8 pages.

Tang, J. et al., *NAVIS-An UGV Indoor Positioning System Using laser Scan Matching for large-Area Real-Time Applications*, [online] [retrieved Apr. 25, 2017]. Retrieved from the Internet: <URL: https://www.ncbi.nlm.nih.gov/pmc/articles/PMC4168456/> (dated Jul. 4, 2014) 14 pages.

Yuan, X., *Three Dimensional Reconstruction as an Automatic Modeling System*, Thesis, Department of Computing Science, University of Alberta (1993) 80 pages.

* cited by examiner

US 10,539,676 B2

METHOD, APPARATUS AND COMPUTER PROGRAM PRODUCT FOR MAPPING AND MODELING A THREE DIMENSIONAL STRUCTURE

TECHNOLOGICAL FIELD

An example embodiment of the present invention relates generally to mapping and modeling a three dimensional structure, and more particularly, to using LIDAR mapping data or equivalents thereof in combination with trajectory information to accurately model a multi-level parking garage which may be used for navigation purposes.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. While most location-based services rely on maps, such as digital representations of conventional paper maps, these digital representations may suffer from a lack of granularity with respect to precise navigation and route guidance. Further, these digital representations of maps may rely upon widely available data with respect to roadways, but may lack detail beyond roadways.

Data received from infrastructure monitoring systems and crowd-sourced data has become ubiquitous and may be available for facilitating route guidance and navigation system information. However, this data can be mined to provide various other services to users and to grow the availability of location-based services. Further, the ubiquity and relative low-cost of sensors provides access to tremendous amounts of data that can be used in various ways to enhance location-based services.

BRIEF SUMMARY

A method, apparatus, and computer program product are therefore provided for generating a three-dimensional surface model of an interior of a structure based on the segmentation of sensor data using trajectory data. Embodiments may provide an apparatus including at least one processor and at least one non-transitory memory including computer program code instructions. The computer program code instructions configured to, when executed, cause the apparatus to at least: receive sensor data indicative of a trajectory; receive sensor data defining structural surfaces within a structure; generate a three-dimensional point cloud from the sensor data defining structural surfaces within the structure; segment the three-dimensional point cloud into two or more segments based, at least in part, on the sensor data indicative of trajectory; and generate a three-dimensional surface model of an interior of the structure based on the segmented three-dimensional point cloud. The sensor data defining structural surfaces within the structure may include LIDAR data, and causing the apparatus to segment the three-dimensional point cloud into two or more segments may include causing the apparatus to: determine a trajectory associated with each element of the LIDAR data; and segment the three-dimensional point cloud from the LIDAR data based on the trajectory associated with each element of the LIDAR data to obtain LIDAR data associated with each respective level within the structure.

According to some embodiments, causing the apparatus to determine a trajectory associated with each element of the LIDAR data may include causing the apparatus to: simplify a trajectory path according to a line regression including a plurality of simplified path points; determine path points to be turning points in response to an angle of the trajectory path at the respective path point satisfying a predefined measure; and segment the trajectory path according to the determined turning points. The sensor data indicative of a trajectory may include an inertial measurement unit sensor where inertial measurement unit sensor odometry may be applied to the LIDAR sensor data to remove a motion distortion effect from the LIDAR data. According to some embodiments, the apparatus may optionally be caused to: receive image data of the interior of the structure; align the image data of the interior of the structure with the LIDAR data defining structural surfaces within the structure; and identify structural elements of the interior of the structure in the three-dimensional point cloud based on the alignment of the image data with the LIDAR data.

Causing the apparatus of some embodiments to generate a three-dimensional surface model of the interior of the structure based on the segmented three-dimensional point cloud may include causing the apparatus to identify structural elements of the interior of the structure using feature recognition and categorize the structural elements. The structural elements may include one or more of walls, floors, ceilings, or ramps. Causing the apparatus of some embodiments to generate a three-dimensional point cloud from the sensor data defining structural surfaces within the structure may include causing the apparatus to perform a hole filling operation with a parametric window size to fill holes in the point cloud satisfying the parametric window size. Causing the apparatus to generate a three-dimensional surface model of an interior of the structure based on the segmented three-dimensional point cloud may include causing the apparatus to apply a B-spline surface fitting approach to the three-dimensional point cloud and merging B-spline surfaces to generate a continuous three-dimensional surface model.

Embodiments described herein may provide a computer program product including at least one non-transitory computer-readable storage medium having computer-executable program code instructions stored therein. The computer-executable program code instructions may include program code instructions to: receive sensor data indicative of a trajectory; receive sensor data defining structural surfaces within a structure; generate a three-dimensional point cloud from the sensor data defining structural surfaces within the structure; segment the three-dimensional point cloud into two or more segments based, at least in part, on the sensor data indicative of trajectory; and generate a three-dimensional surface model of an interior of the structure based on the segmented three-dimensional point cloud. The sensor data defining structural surfaces within a structure may include LIDAR data, where the program code instructions to segment the three-dimensional point cloud into two or more segments may include program code instructions to: determine a trajectory associated with each element of the LIDAR data; and segment the three-dimensional point cloud from the LIDAR data based on the trajectory associated with each element of the LIDAR data to obtain LIDAR data associated with each respective level within the structure.

According to some embodiments, the program code instructions to determine a trajectory associated with each element of the LIDAR data may include program code instructions to: simplify a trajectory path according to a line regression including a plurality of simplified path points; determine path points to be turning points in response to an angle of the trajectory path at the respective path point satisfying a predetermined measure; and segment the trajectory path according to the determined turning points. The sensor data indicative of a trajectory may include an inertial measurement unit sensor where inertial measurement unit sensor odometry may be applied to the LIDAR sensor data to remove a motion distortion effect from the LIDAR data. Embodiments may optionally include program code instructions to: receive image data of the interior of the structure; align the image data of the interior of the structure with the LIDAR data defining structural surfaces within the structure; and identify structural elements of the interior of the structure in the three-dimensional point cloud based on the alignment of the image data with the LIDAR data.

The program code instructions to generate a three-dimensional surface model of the interior of the structure based on the segmented three-dimensional point cloud may include program code instructions to identify structural elements of the interior of the structure using feature recognition and categorize the structural elements. The structural elements may include one or more of walls, floors, ceilings, or ramps. The program code instructions to generate a three-dimensional point cloud from the sensor data defining structural surfaces within the structure may include program code instructions to perform a hole filling operation with a parametric window size to fill holes in the point cloud satisfying the parametric window size. The program code instructions to generate a three-dimensional surface model of an interior of the structure based on the segmented three-dimensional point cloud may include program code instructions to apply a B-spline surface fitting approach to the three-dimensional point cloud and merging B-spline surfaces to generate a continuous three-dimensional surface model.

Embodiments herein may provide a method including: receiving sensor data indicative of a trajectory; receiving sensor data defining structural surfaces within a structure; generating a three-dimensional point cloud from the sensor data defining structural surfaces within the structure; segmenting the three-dimensional point cloud into two or more segments based, at least in part, on the sensor data indicative of trajectory; generating a three-dimensional surface model of an interior of the structure based on the segmented three-dimensional point cloud; and providing the three-dimensional surface model of an interior of the structure to an advanced driver assistance system to facilitate autonomous vehicle parking.

According to some embodiments, the sensor data defining structural surfaces within a structure may include LIDAR data, where segmenting the three-dimensional point cloud into two or more segments may include: determining a trajectory associated with each element of the LIDAR data; and segmenting the three-dimensional point cloud from the LIDAR data based on the trajectory associated with each element of the LIDAR data to obtain LIDAR data associated with each respective level within the structure. Determining a trajectory associated with each element of the LIDAR data may include: simplifying a trajectory path according to a line regression including a plurality of simplified path points; determining path points to be turning points in response to an angle of the trajectory path at the respective path point satisfying a predetermined measure; and segmenting the trajectory path according to the determined turning points.

Embodiments herein may provide an apparatus including: means for receiving sensor data indicative of a trajectory; means for receiving sensor data defining structural surfaces within a structure; means for generating a three-dimensional point cloud from the sensor data defining structural surfaces within the structure; means for segmenting the three-dimensional point cloud into two or more segments based, at least in part, on the sensor data indicative of trajectory; means for generating a three-dimensional surface model of an interior of the structure based on the segmented three-dimensional point cloud; and means for providing the three-dimensional surface model of an interior of the structure to an advanced driver assistance system to facilitate autonomous vehicle parking.

According to some embodiments, the sensor data defining structural surfaces within a structure may include LIDAR data, where the means for segmenting the three-dimensional point cloud into two or more segments may include: means for determining a trajectory associated with each element of the LIDAR data; and means for segmenting the three-dimensional point cloud from the LIDAR data based on the trajectory associated with each element of the LIDAR data to obtain LIDAR data associated with each respective level within the structure. The means for determining a trajectory associated with each element of the LIDAR data may include: means for simplifying a trajectory path according to a line regression including a plurality of simplified path points; means for determining path points to be turning points in response to an angle of the trajectory path at the respective path point satisfying a predetermined measure; and means for segmenting the trajectory path according to the determined turning points.

BRIEF DESCRIPTION OF THE DRAWINGS

Figure 1:
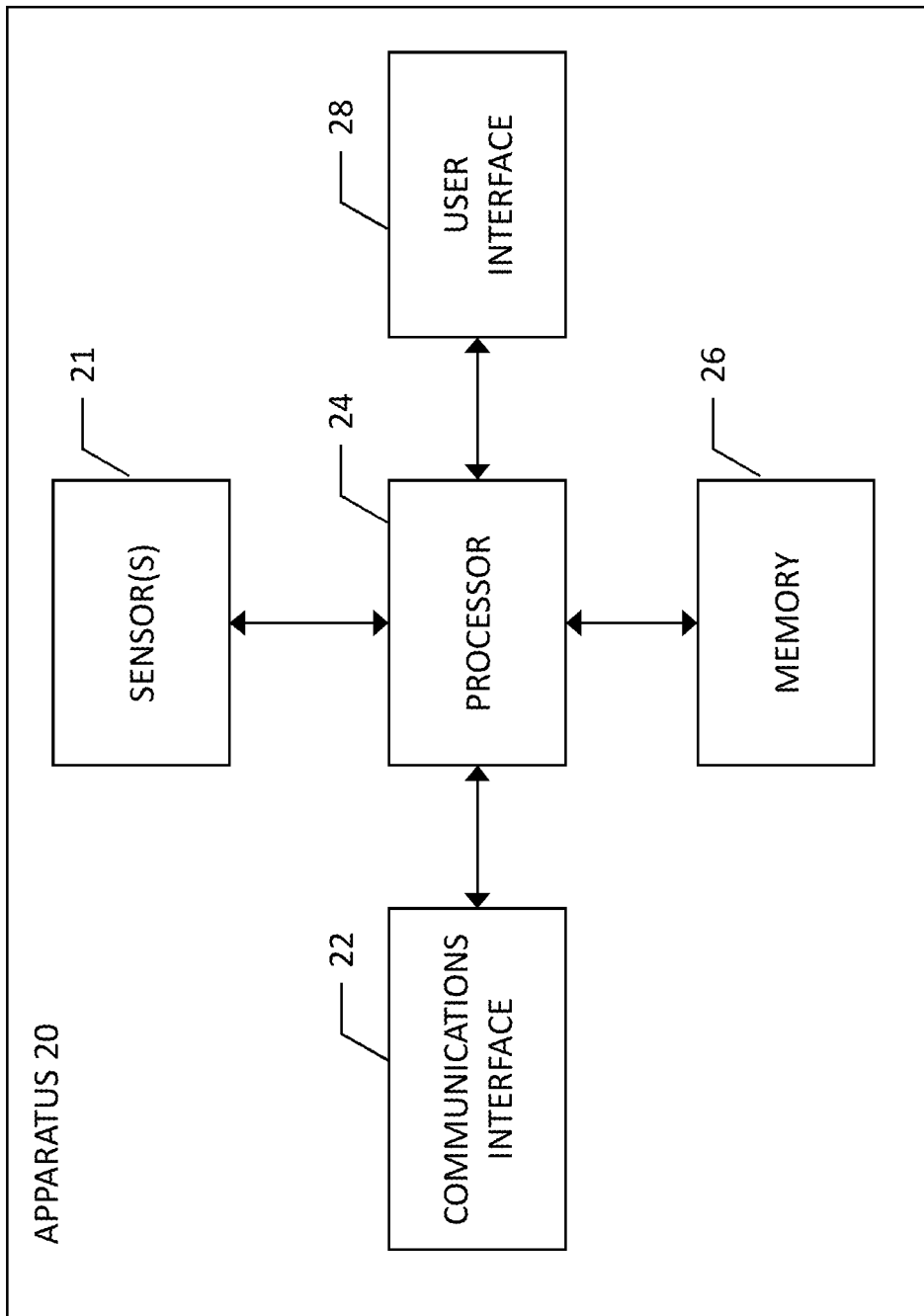
Figure 2:
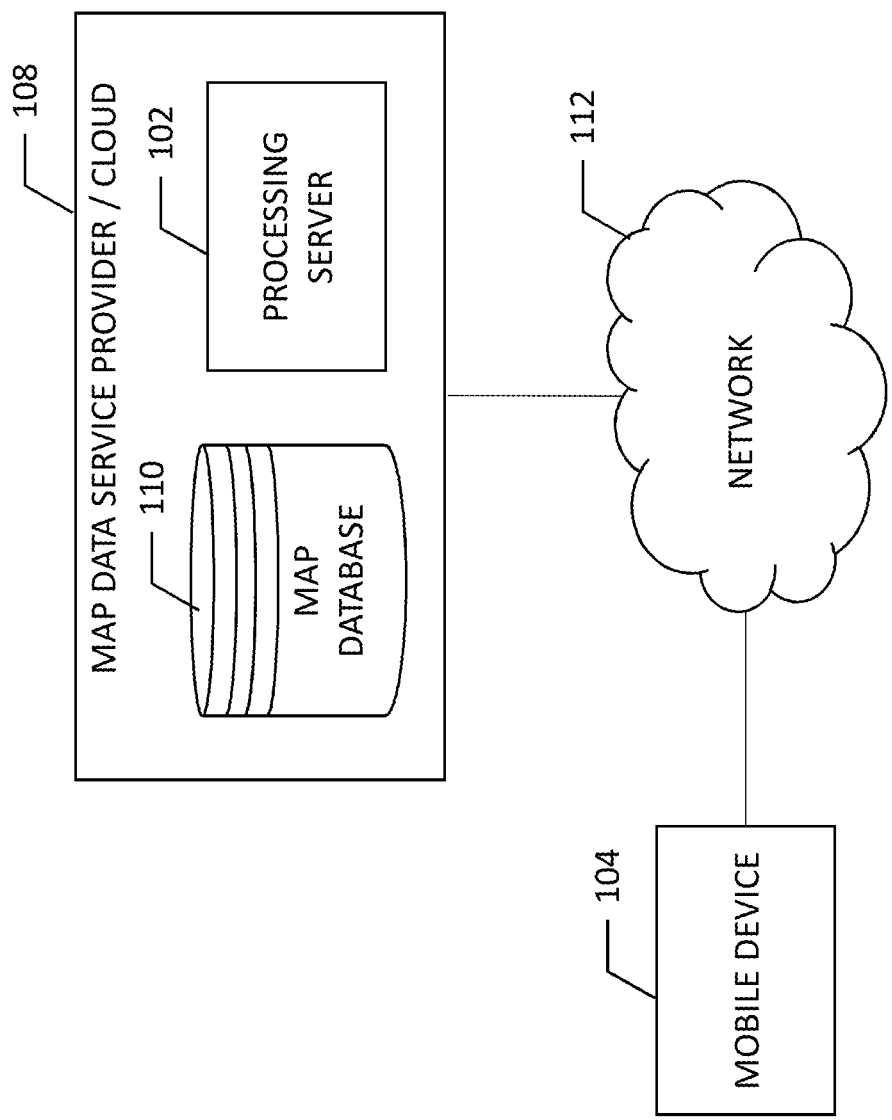
Figure 3:
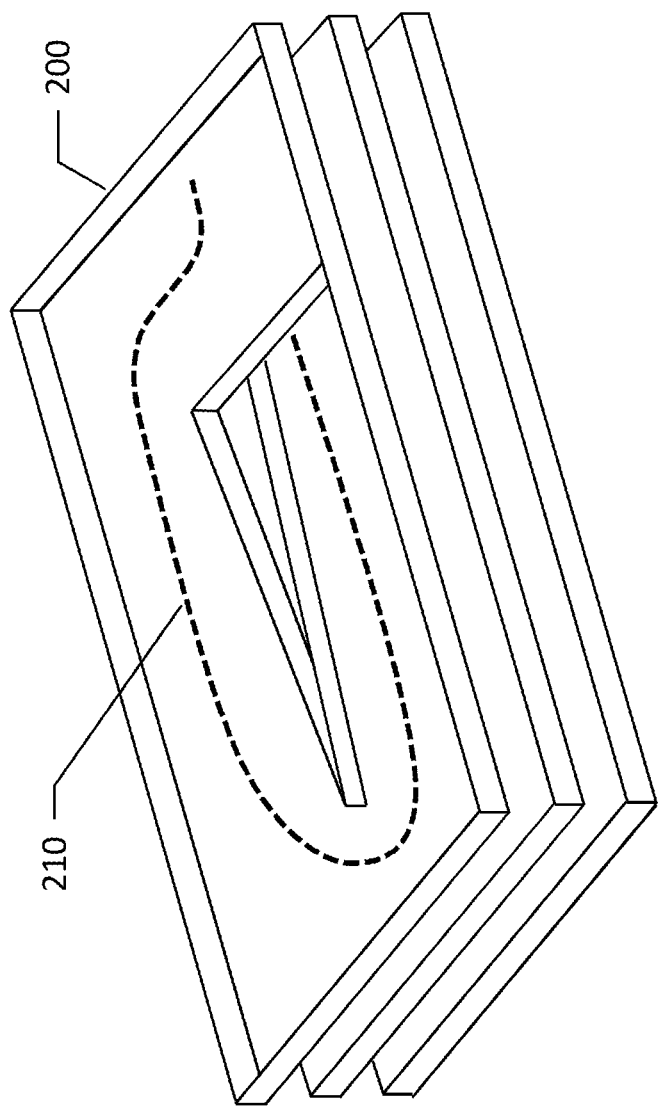
Figure 4:
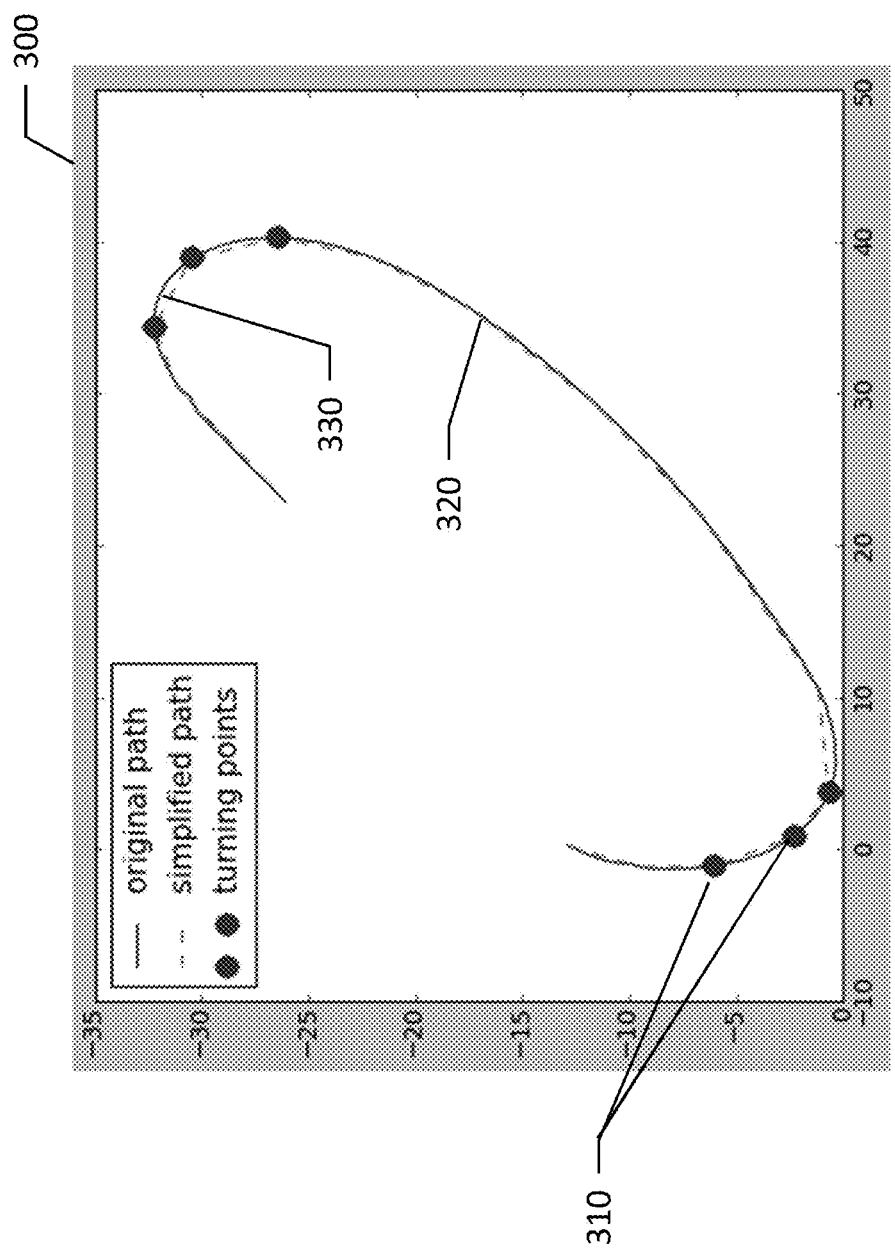
Figure 5:
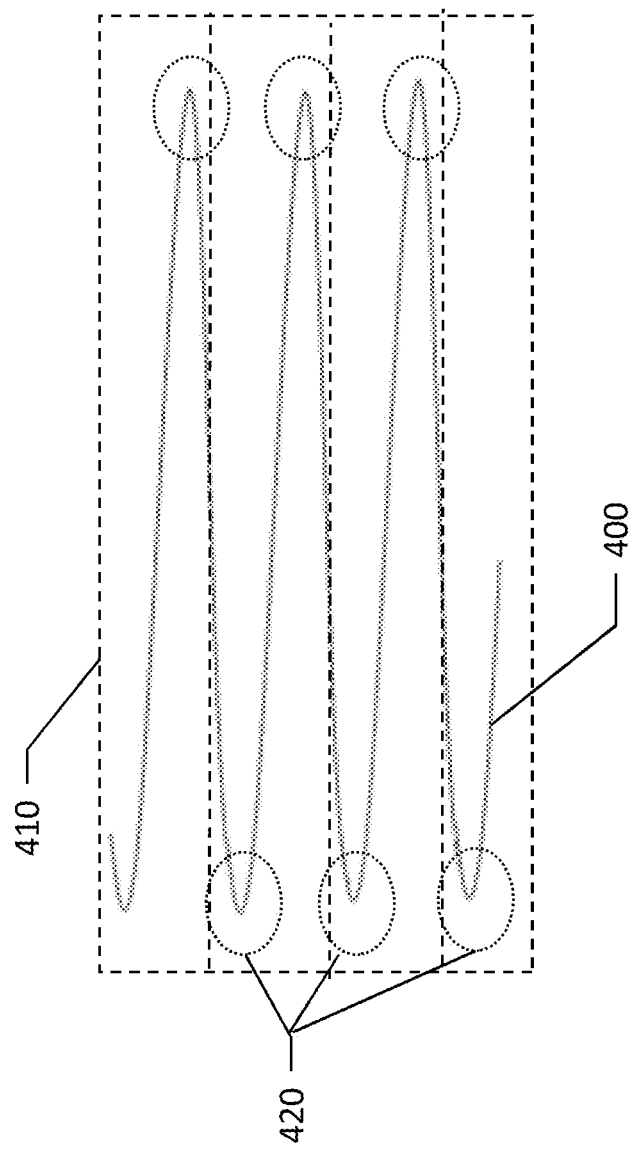
Figure 6:
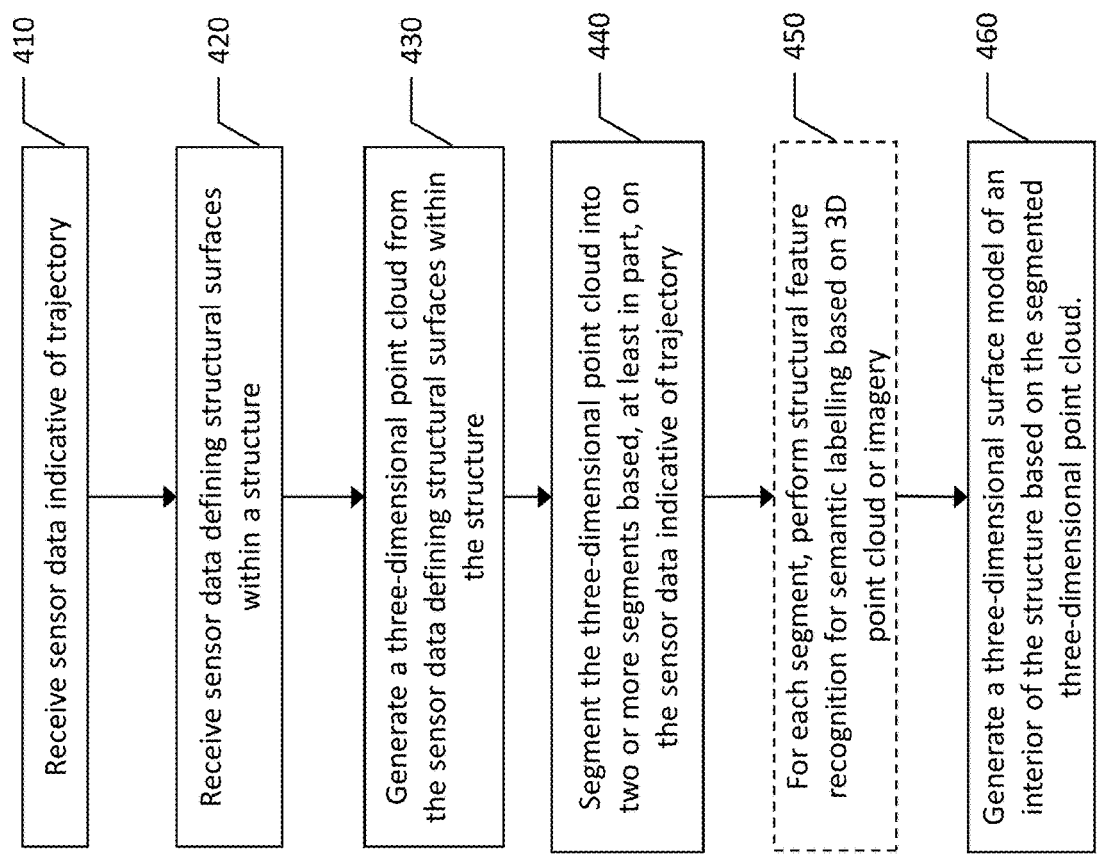

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system for generating a model of a three dimensional structure according to an example embodiment of the present invention;

FIG. 3 is an example embodiment of a path within a multi-level parking structure according to an example embodiment of the present invention;

FIG. 4 is an example of a portion of a path within a multi-level parking structure isolated and simplified according to an example embodiment of the present invention;

FIG. 5 is a profile view of a path of a vehicle through a multi-level parking structure according to an example embodiment of the present invention; and FIG. 6 is a flowchart of a method for generating a three dimensional model for a multi-level parking structure according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for generating a vector map representation of a multi-level three-dimensional structure, such as a multi-level parking garage, which may be sufficiently accurate and scalable for use in navigation of the parking garage or autonomous parking within the garage. Embodiments described herein provide a system with techniques to reconstruct a three-dimensional LIDAR point cloud model for an indoor multi-level parking garage, and automatically convert it into a three dimensional vector map to support applications such as autonomous parking.

While example embodiments described herein generally refer to generating a representation of a multi-level parking structure, it is appreciated that embodiments may be used for various other purposes, such as mapping buildings, tunnels, multi-level bridges, or other structures which may benefit from the unique methods described herein.

Embodiments described herein provide six degree-of-freedom pose estimation for reconstruction of a structure and is not vulnerable to light condition changes such as time of day and night. The multi-sensor fusion techniques described herein ensure accurate and robust visual inertial odometry. Through the integration of Light Detection and Ranging (LIDAR) scanning channels, trajectory segmentation information and segment histograms, embodiments described herein are capable of filtering certain portions of a point cloud (such as a ceiling from a floor) such that each floor is segmented with accurate corresponding texture information from the LIDAR reflectivity perception. Further, a B-Spline surface fitting approach may be used to model the segments of a floor and allow surface merging to be applied to create a continuous three-dimensional surface model. Through the integration of the vertical wall and column contours, the model can be projected into two-dimensions to support applications such as autonomous vehicle navigation within the structure and autonomous parking.

While LIDAR is described herein according to example embodiments for establishing the position of surfaces in a three-dimensional point cloud, a variety of techniques may be used to accomplish a similar three-dimensional point cloud. Light sensing, imagery (e.g., multi-view such as stereoscopic), acoustic sensing, or various other forms of surface detection techniques may be used for generating a three-dimensional point cloud. Thus, while LIDAR is described with regard to example embodiments, various embodiments may use techniques other than LIDAR.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering position/location and environment related information and/or for generating a three-dimensional map and/or model for use in a variety of applications. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), LIDAR sensor (transmitter and receiver), local positioning sensor (e.g., odometer or wheel sensor), or any of a variety of sensors configured to establish location information and environment information around the sensor(s). Any of the sensors may be used to sense information regarding the movement, positioning, or orientation of the device and for determining the structure and layout of the surroundings or environment at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as surfaces in the surroundings of the sensor and establish location based on other sensor data, such as GPS data, for structure information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways or within enclosed or substantially enclosed structures, such as multi-level parking garages. Devices and systems may receive an indication of a current location of the user, and any structure-related data associated with the current location or destination of a user, such as a parking structure proximate a user's destination. It is, however, appreciated that example embodiments described herein can be implemented outside of a navigation system, such as on a user device or other device that may not necessarily also provide navigation services.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, maneuvering data, and/or data regarding structures. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, parking lots, parking structures (e.g., multi-level parking structures), etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning. However, the most ubiquitous form of data that may be available is vehicle data provided by vehicles, such as mobile device 104, as they travel the roads throughout a region, network of roads, or within a structure. These vehicles or probes may be embodied by mobile device 104 and may provide data to the map data service provider in the form of traffic speed/congestion data, weather information, location, speed, direction, building structure information etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as for a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can further provide navigation through enclosed structures, such as a multi-level parking structure, and may facilitate autonomous vehicle control, such as autonomous parking within a multi-level parking structure. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases, where navigation databases can include data related to the structure of multi-level vehicle parking structures to facilitate navigation thereof.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include a vehicle infotainment system, an in-dash navigation head unit, a personal navigation device, cellular telephone, or an Advanced Driver Assistance System (ADAS) which may facilitate automated driving features such as autonomous driving and/or parking. An end user can use the mobile device 104 for navigation and map functions such as guidance and map display, for example, and for determination of useful driver assistance information, according to some example embodiments.

Example embodiments provided herein provide a method for generating a vector map representation of a three dimensional structure, such as a multi-level parking garage, which may be sufficiently accurate and scalable for use in navigation of the parking garage or for autonomous parking within the parking garage. Embodiments use techniques to reconstruct a three-dimensional point cloud model for the interior of a multi-level parking garage and convert that model to a three-dimensional vector map and local grid map to support application such as autonomous parking.

Accurate and concise maps of the interior of a structure, such as a multi-level parking garage, are necessary for proper functionality of some applications in the perspective of scalability. For example, autonomous parking applications require an accurate and concise map of the interior of a multi-level parking garage to support localization, motion planning and as a prior for environment dynamic handling. Methods described herein use a stable six degree-of-freedom pose estimation for three-dimensional LIDAR data (or the like) reconstruction of the interior of a structure where GPS is either unavailable or unreliable. Embodiments may use a LIDAR odometry, an inertial measurement unit (IMU) multi-sensor fusion, and scan matching approach when prior map model is existing, for the six degree-of-freedom pose estimation and three-dimensional point cloud model reconstruction.

The automation processing of a three-dimensional point cloud may be critical for map scalable creation. Purely from the point cloud model, the temporal information of LIDAR scanning channels and pose estimation of scanning frames are ignored, which could be used to augment automatically filtering and segmentation. Embodiments described herein use trajectory segmentation and an elevation histogram analysis approach for point cloud segmentation to provide a more accurate model with less noise.

Concise three-dimensional modeling plays an important role for the efficiency of maps. Triangular and quadrilateral meshes may work to model small scale objects. However, to model large scale and structured building information maps, embodiments described herein implement a B-spline three-dimensional surface fitting for global static modeling. Combining the global static model with a respective two-dimensional contour, a two-dimensional geometric vector map may be generated to support applications such as autonomous parking path planning.

Navigation of roadways through digital map data can be informed through map data from municipalities, probe data from vehicles traversing the roads, or known vehicles traversing roads to establish the physical location of the roads. This mapping enables relatively accurate mapping of roadways and facilitates navigation and autonomous driving application. However, structures, such as multi-level parking structures, often lack accurate representations of vehicular paths therein. Mapping of multi-level parking structures may rely on property owners or managers supplying two dimensional maps, images, or CAD (computer aided design) files. While such files may be sufficient for certain applications, mapping and autonomous driving or parking may require more detailed and accurate representations of physical structures.

Three-dimensional point cloud reconstruction of a physical structure based on range sensor data such as RGB-D or LIDAR sensors may provide raw measurement and visualization for the construction of a structure. This point cloud can be useful for on-the-fly environment perception and obstacle detection. However, due to a lack of parametric and semantic representation, three-dimensional point cloud reconstruction may not be sufficient for high-level applications such as navigation or autonomous vehicle control (e.g., driving, parking, etc.).

A three-dimensional point cloud model can be further segmented (either by interactive or automated processes) and a tessellation procedure may be used for the three-dimensional mesh modeling, such as the triangular meshes used as the primitive for representation and rendering as they are easily converted to other geometric representations with different levels of details. However, these meshes, in the form of triangular, quadrilateral, etc., may not be able to support high-level applications such as navigation, and may not be concise enough in terms of map scalability to be practical. Elevation mapping may be applied to support indoor and outdoor terrestrial autonomous navigation for some applications, such as a mobile robot; however, it is generally not able to support the multi-level building three-dimensional modeling and is also not concise enough for map scalability.

Example embodiments described herein provide a system to overcome the aforementioned deficiencies. A system may include a mobile device, such as apparatus 20 of FIG. 1, which may be a sensing vehicle having three-dimensional LIDAR (or the like vision sensors), GPS, and/or INS (inertial navigation sensing) unit. The sensing vehicle may obtain the necessary data from a structure or "sensed object" such as a multi-level parking garage to reconstruct the parking garage in a three-dimensional map. The sensing vehicle may obtain sensor data as the vehicle traverses the sensed object to provide sensor data output which may be stored in, for example, memory 26. The sensed data may be provided to a server, such as processing server 102 of map data service provider 108 for reconstruction of the three-dimensional map of the parking garage. Optionally, the sensed data may be processed by the sensing device (e.g., an apparatus as in FIG. 1) and a three dimensional model of the structure may be generated in real-time as the apparatus traverses the structure.

While mapping may be performed on sensed data from a single vehicle or mobile device 104, embodiments may benefit from a plurality of vehicles or mobile devices 104 providing data regarding the same structure in order to minimize any data noise and to improve the accuracy of the three-dimensional map reconstruction. The mapping and modeling may be performed through an initial reconstruction of the three-dimensional point cloud model of the indoor multi-level parking garage based on the LIDAR data and IMU (inertial measurement unit) odometry from the vehicle or mobile device 104. Each floor or level of the multi-level parking structure may be segmented in the three-dimensional point cloud model, such that the segmented data may be used to reconstruct a surface model for the multi-level parking garage.

The sensor platform may be a vehicle specifically configured for generating the necessary sensed data, or may be crowd-sourced from a vehicle that has the same sensing capabilities that has collected data from the structure of interest (e.g., the structure to be mapped). Such a vehicle may include a three-dimensional LIDAR range sensor or image sensors configured to measure the surroundings of the vehicle, and a GPS/INS unit that allows for positioning outside of the structure for providing an augmented reference for the LIDAR odometry. As the GPS/INS may be insufficient in providing location or position data from within an enclosed structure, particularly a structure such as a multi-level parking structure, an additional sensor, such as a wheel encoder, may be used to supplement the GPS/INS to provide positioning within the structure.

The mobile device 104 or sensing vehicle may use GPS/INS for global positioning outside of the structure, where reliable satellite signal is available. The GPS/INS signal is used as the reference point during the transition of going from outside the structure to inside the structure, or vice versa. The GPS/INS signal may thus be informative of the entrance and exit points from the structure. The three-dimensional LIDAR sensor or image sensor may collect the range data surrounding the vehicle, colored by the reflectivity field, and may be synchronized with the GPS/INS data for fused LIDAR odometry. The wheel encoder or other local-positioning sensor, may provide the supplemental position information when there are no stable GPS/INS indications for the LIDAR odometry. Optionally, according to some embodiments, the LIDAR sensor or image sensor may be used to both gather sensor data from the surfaces of the environment (e.g., the interior of a multi-level parking structure), but also to establish a trajectory through distinctions in the environment data over a period of time.

Three-dimensional point cloud model reconstruction can occur by taking advantage of the structure environment characteristics as sampled from two-dimensional manifolds. A generalized iterative closest point (G-ICP) approach may be applied for the point cloud registration from LIDAR perception. To improve the iterative convergence efficiency and robustness of the LIDAR odometry, an extended Kalman filter may be used to fuse the IMU data as a prior for LIDAR odometry. By using the IMU odometry as the prediction, the effect of the LIDAR device motion distortion may be removed.

For frames from adjacent periods of time (e.g., sequent frames P and Q), edge points and planar points are respectively performed as the feature detection. The point cloud may be stored in a three-dimensional K-dimensional-tree for fast index, then the correspondences of the feature points found are selected based on the nearest neighbor. Finally, the G-ICP approach may be applied to compute the homogenous transformation between frames P and Q.

After the reconstruction of the three-dimensional point cloud model, the LIDAR points may be projected and re-sampled into a voxel space representation. A result of re-sampling is that each voxel contains one and only one point. More points in a voxel will increase the information loss since the voxel will get only one value at the end. Conversely, if the voxel size is too small and the number of voxels that contain no laser points becomes large, the redundancy increases as well as the storage requirements. Considering LIDAR points which are not highly irregular, the optimal re-sampling pixel size may be equal to the minimum density of the LIDAR points based on a random down-sampling sub-datasets at a certain distance. Due to LIDAR occlusions and the nature of the material of the structure being scanned, there exist holes in the three-dimensional point cloud voxel model. To remove these holes, a hole-filling operation is performed directly using morphological operating, in which way a parametric window size is used for hole-filling, and the edge of the voxel model is not affected by padding.

Due to the complexity of the three-dimensional point cloud voxel model, the modeling cannot be directly converted to a vector map. Embodiments described herein perform segmentation for the voxel model based on a trajectory segmentation and analysis of elevation histograms. This eliminates the issue of points in the point cloud that are interpreted to be on an adjacent floor, such as a point on a floor that is interpreted as a point on a ceiling of the floor below. FIG. 3 illustrates a trajectory 210 on a three-dimensional point cloud model 200 of a multi-level parking garage. However, with the uncertainty of the range perception, the point cloud of neighboring floors are overlapped due to uncertainty between the ceiling and floor. This overlap results in intensity map degradation. Said differently, the floor of one level is not easily distinguished in the point cloud from the ceiling of the floor below.

To overcome this issue and to obtain a more clear intensity image, the three-dimensional point cloud may be segmented into different parts (e.g., different floors of the parking structure). This may be accomplished by detecting the curvature of the points along the trajectory. FIG. 4 illustrates the simplification of the trajectory path according to line regression with a predefined threshold. The original path 320 is defined with turning points 310 on display 300, with simplified path 330. The curvature angle of simplified path points may be computed, and the path points with the relatively highest curvature angles may be established as the turning points 310 for the trajectory. The curvature angle of the simplified path may be defined as the angle between the two path segments that meet at the turning point. For example, 180 degrees would be a straight line through the point, whereas 75 degrees would be a turning point with a high curvature angle. In this way, the trajectory of the vehicle path may be segmented into multiple parts. Using the pose information of the segments, the model can be reconstructed for each segmentation, and the point cloud for each floor separated, thereby eliminating confusion in the point cloud between floor points and ceiling points. FIG. 5 illustrates a path 400 through a multi-level parking garage 410 including the turning points identified at 420.

An elevation histogram may be generated after the floor segmentation using the turning points since the three-dimensional point cloud model cannot, on its own, be relied upon for distinguishing between the floor of one level and the ceiling of the level below. Using the point cloud segments, semantic recognition for the three-dimensional map reconstruction may be possible. Taking pose estimation from the LIDAR-IMU odometry fusion, each level of a multi-level parking structure may be segmented using the turning point analysis. Subsequently, the three-dimensional point cloud model for each segmented floor may be analyzed by the elevation histogram. The modes from the elevation histogram may be classified into various indoor features, such as floors, walls, stairs, ramps, ceiling, etc using recognition techniques (such as deep neural networks) based on the point cloud and the imagery data. The data points of the same mode or "chunk" may be clustered as a homogeneous feature. All homogeneous pieces may then be labeled in the three dimensional point cloud of the structure, which facilitates a semantic indoor parking garage map.

According to an optional embodiment, taking the pose estimation from the LIDAR-IMU odometry fusion, each floor may be segmented based on the turning point analysis while deep-learning-based image recognition may be performed on the three dimensional point cloud or imagery data for each segmented floor. This deep-learning technique may be used to establish which points are points in the cloud are to be categorized as floors, walls, stairs, ramps, etc. as homogeneous pieces. This can be used to align LIDAR data with camera image data to create a semantic three-dimensional indoor parking garage map.

After segmentation of the LIDAR scanned data (the three-dimensional point cloud), embodiments described herein may use a B-spline surface fitting and merging approach to build a three-dimensional surface model. B-spline surfaces can be used to express a large object with satisfactory accuracy. For a selected segment, the B-spline surface reconstruction may begin from control points $P_{ij}$. To express the uncertainty of the extracted surface, the control points are defined as the multivariate gamma distribution with covariance matrix with regard to the measurement model. Embodiments described herein select the control points based on the ground floor segmentation of a multi-level structure from down-up filtering. The knot vector of the B-spline is chosen based on the geometric distance between control points.

By minimizing the error between control points and the extracted surface S, the B-spline surfaces can be reconstructed for each segment. Based on the covariance matrix of the control points, the covariance matrix of the generated sample points from B-spline surfaces can be readily obtained by calculating the partial derivative of the surface S. In a surface reconstruction of a large object or environment, a large number of scans may be needed. During this reconstruction process, assuming that N scans are obtained and the corresponding extracted B-spline surfaces are extracted from these scans. These B-spline surfaces may be stored to represent the currently reconstructed part of the object rather than the point clouds. By computing the geometric cross line of the neighbor B-spline surfaces, embodiments described herein divide the B-spline surfaces into multiple sub-surfaces, and the overlap sub-surfaces are further selected to perform the B-spline surface merging. Using the partial derivation of the overlapped sub-surface, the new B-spline surface model may be updated by seamless integration of the neighbor B-spline surface.

FIG. 6 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for generating a three-dimensional surface model of the interior of a structure using LIDAR scanning or equivalents thereof and trajectory information. As shown, sensor data indicative of trajectory is received at 410. The trajectory data may be generated through a variety of means, such as a wheel encoder sensor configured to monitor movement of a vehicle, location fingerprinting through the received signal strengths of local wireless access points, or the like. Sensor data defining structural surfaces within a structure may be received at 420. This data may be acquired through a sensor, such as a LIDAR sensor, image sensor, acoustic range sensor, or the like. At 430, a three-dimensional point cloud may be generated from the sensor data defining structural surfaces within the structure may be generated. The three-dimensional point cloud may be segmented into two or more segments based, at least in part, on the sensor data indicative of trajectory at 440. For each segment, structural feature recognition for semantic labeling based on the three dimensional point cloud or imagery may optionally be performed as indicated by the dashed-line block 450. A three-dimensional surface model may then be generated of an interior of the structure based on the segmented three-dimensional point cloud at 460.

In an example embodiment, an apparatus for performing the method of FIG. 6 above may comprise a processor (e.g., the processor 24) configured to perform some or each of the operations (410-460) described above. The processor may, for example, be configured to perform the operations (410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-460 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
receive sensor data indicative of a trajectory;
receive sensor data defining structural surfaces within a multi-level structure wherein the sensor data defining structural surfaces within a structure comprises Light Detection and Ranging (LIDAR) data;
generate a three-dimensional point cloud from the sensor data defining structural surfaces within the multi-level structure;

segment the three-dimensional point cloud into two or more vertically offset segments based, at least in part, on the sensor data indicative of trajectory by causing the apparatus to:
 determine a trajectory associated with the LIDAR data;
 determine turning points within the LIDAR data based on the determined trajectory;
 segment the three-dimensional point cloud from the LIDAR data into vertically offset segments based on the turning points to obtain LIDAR data associated with each respective level within the structure, wherein each respective level corresponds to a respective vertically offset segment; and
 generate a three-dimensional surface model of an interior of the structure based on the segmented three-dimensional point cloud.

2. The apparatus of claim 1, wherein causing the apparatus to determine a trajectory associated with the LIDAR data including turning points within the LIDAR data based on the determined trajectory comprises causing the apparatus to:
 simplify a trajectory path according to a line regression comprising a plurality of simplified path points; and
 determine path points to be turning points in response to an angle of the trajectory path at the respective path point satisfying a predefined measure.

3. The apparatus of claim 1, wherein the sensor data indicative of a trajectory comprises an inertial measurement unit sensor, and wherein inertial measurement unit sensor odometry is applied to the LIDAR sensor data to remove a motion distortion effect from the LIDAR data.

4. The apparatus of claim 1, wherein the apparatus is further caused to:
 receive image data of the interior of the structure;
 align the image data of the interior of the structure with the LIDAR data defining structural surfaces within the structure; and
 identify structural elements of the interior of the structure in the three-dimensional point cloud based on the alignment of the image data with the LIDAR data.

5. The apparatus of claim 1, wherein causing the apparatus to generate a three-dimensional surface model of the interior of the structure based on the segmented three-dimensional point cloud comprises causing the apparatus to identify structural elements of the interior of the structure using feature recognition and categorize the structural elements.

6. The apparatus of claim 5, wherein the structural elements comprise one or more of walls, floors, ceilings, or ramps.

7. The apparatus of claim 1, wherein causing the apparatus to generate a three-dimensional point cloud from the sensor data defining structural surfaces within the structure comprises causing the apparatus to perform a hole filling operation with a parametric window size to fill holes in the point cloud satisfying the parametric window size.

8. The apparatus of claim 1, wherein causing the apparatus to generate a three-dimensional surface model of an interior of the structure based on the segmented three-dimensional point cloud comprises causing the apparatus to apply a B-spline surface fitting approach to the three-dimensional point cloud, and merging B-spline surfaces to generate a continuous three-dimensional surface model.

9. The apparatus of claim 1, wherein the apparatus is further caused to label sub-surfaces within the three dimensional surface model according to recognized homogeneous indoor structural categories to support semantic map modeling.

10. A computer program product comprising at least one non-transitory computer-readable storage medium having computer-executable program code instructions stored therein, the computer-executable program code instructions comprising program code instructions to:
 receive sensor data indicative of a trajectory;
 receive sensor data defining structural surfaces within a multi-level structure wherein the sensor data defining structural surfaces within a structure comprises Light Detection and Ranging (LIDAR) data;
 generate a three-dimensional point cloud from the sensor data defining structural surfaces within the multi-level structure;
 segment the three-dimensional point cloud into two or more vertically offset segments based, at least in part, on the sensor data indicative of trajectory, wherein the program code instructions to segment the three-dimensional point cloud comprises program code instructions to:
  determine a trajectory associated with the LIDAR data;
  determine turning points within the LIDAR data based on the determined trajectory;
  segment the three-dimensional point cloud from the LIDAR data into vertically offset segments based on the turning points to obtain LIDAR data associated with each respective level within the structure, wherein each respective level corresponds to a respective vertically offset segment; and
 generate a three-dimensional surface model of an interior of the structure based on the segmented three-dimensional point cloud.

11. The computer program product of claim 10, wherein the program code instructions to determine a trajectory associated with the LIDAR data including turning points within the LIDAR data based on the determined trajectory comprise program code instructions to:
 simplify a trajectory path according to a line regression comprising a plurality of simplified path points; and
 determine path points to be turning points in response to an angle of the trajectory path at the respective path point satisfying a predetermined measure.

12. The computer program product of claim 10, wherein the sensor data indicative of a trajectory comprises an inertial measurement unit sensor, and wherein inertial measurement unit sensor odometry is applied to the LIDAR sensor data to remove a motion distortion effect from the LIDAR data.

13. The computer program product of claim 10, further comprising program code instructions to:
 receive image data of the interior of the structure;
 align the image data of the interior of the structure with the LIDAR data defining structural surfaces within the structure; and
 identify structural elements of the interior of the structure in the three-dimensional point cloud based on the alignment of the image data with the LIDAR data.

14. The computer program product of claim 10, wherein the program code instructions to generate a three-dimensional surface model of the interior of the structure based on the segmented three-dimensional point cloud comprise program code instructions to identify structural elements of the interior of the structure using feature recognition and categorize the structural elements.

15. The computer program product of claim 14, wherein the structural elements comprise one or more of walls, floors, ceilings, or ramps.

16. The computer program product of claim 10, wherein the program code instructions to generate a three-dimensional point cloud from the sensor data defining structural surfaces within the structure comprise program code instructions to perform a hole filling operation with a parametric window size to fill holes in the point cloud satisfying the parametric window size.

17. The computer program product of claim 10, wherein the program code instructions to generate a three-dimensional surface model of an interior of the structure based on the segmented three-dimensional point cloud comprises program code instructions to apply a B-spline surface fitting approach to the three-dimensional point cloud, and merging B-spline surfaces to generate a continuous three-dimensional surface model.

18. The computer program product of claim 10, further comprising program code instructions to label sub-surfaces within the three dimensional surface model according to recognized homogeneous indoor structural categories to support semantic map modeling.

19. A method comprising:
receiving sensor data indicative of a trajectory;
receiving sensor data defining structural surfaces within a multi-level structure wherein the sensor data defining structural surfaces within a structure comprises Light Detection and Ranging (LIDAR) data;
generating a three-dimensional point cloud from the sensor data defining structural surfaces within the multi-level structure;
segmenting the three-dimensional point cloud into two or more vertically offset segments based, at least in part, on the sensor data indicative of trajectory by:
  determining a trajectory associated with the LIDAR data;
  determining turning points within the LIDAR data based on the determined trajectory;
  segmenting the three-dimensional point cloud from the LIDAR data into vertically offset segments based on the turning points to obtain LIDAR data associated with each respective level within the structure, wherein each respective level corresponds to a respective vertically offset segment;
generating a three-dimensional surface model of an interior of the structure based on the segmented three-dimensional point cloud; and
providing the three-dimensional surface model of an interior of the multi-level structure to an advanced driver assistance system.

20. The method of claim 19, wherein determining a trajectory associated with the LIDAR data including turning points within the LIDAR data based on the determined trajectory comprises:
simplifying a trajectory path according to a line regression comprising a plurality of simplified path points; and
determining path points to be turning points in response to an angle of the trajectory path at the respective path point satisfying a predetermined measure.

\* \* \* \* \*